(12) United States Patent
Huang et al.

(10) Patent No.: US 7,342,757 B2
(45) Date of Patent: Mar. 11, 2008

(54) SYSTEM AND METHOD FOR QUENCH PROTECTION OF A SUPERCONDUCTOR

(75) Inventors: Xianrui Huang, Clifton Park, NY (US); Kiruba Haran Sivasubramaniam, Clifton Park, NY (US); James William Bray, Niskayuna, NY (US); David Thomas Ryan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 245 days.

(21) Appl. No.: 10/878,589

(22) Filed: Jun. 28, 2004

(65) Prior Publication Data

US 2005/0286180 A1    Dec. 29, 2005

(51) Int. Cl.
*H02H 5/04* (2006.01)
*H02H 7/08* (2006.01)
*H02H 7/00* (2006.01)
*H02H 9/00* (2006.01)
*H01H 73/00* (2006.01)
*H01F 36/00* (2006.01)
*H01F 1/00* (2006.01)
*H01F 6/00* (2006.01)
*H01F 7/00* (2006.01)

(52) U.S. Cl. .................. 361/23; 361/19; 361/93; 361/115; 323/360; 335/216

(58) Field of Classification Search .............. None
See application file for complete search history.

(56) References Cited

U.S. PATENT DOCUMENTS

| 4,371,943 | A | * | 2/1983 | Woods et al. .............. 324/71.6 |
| 5,067,044 | A |   | 11/1991 | Mallick, Jr. et al. .......... 361/19 |
| 5,650,903 | A | * | 7/1997 | Gross et al. ................ 361/19 |
| 5,999,383 | A | * | 12/1999 | Hall et al. .................. 361/19 |
| 6,420,842 | B1 |   | 7/2002 | Gold ......................... 318/141 |
| 6,445,555 | B1 | * | 9/2002 | Buckles et al. ............. 361/19 |

* cited by examiner

*Primary Examiner*—Robert L. Deberadinis
*Assistant Examiner*—Dharti H Patel
(74) *Attorney, Agent, or Firm*—Fletcher Yoder

(57) ABSTRACT

A system and method for protecting a superconductor from a quench condition. A quench protection system is provided to protect the superconductor from damage due to a quench condition. The quench protection system comprises a voltage detector operable to detect voltage across the superconductor. The system also comprises a frequency filter coupled to the voltage detector. The frequency filter is operable to couple voltage signals to a control circuit that are representative of a rise in superconductor voltage caused by a quench condition and to block voltage signals that are not. The system is operable to detect whether a quench condition exists in the superconductor based on the voltage signal received via the frequency filter and to initiate a protective action in response.

30 Claims, 4 Drawing Sheets

SYSTEM AND METHOD FOR QUENCH PROTECTION OF A SUPERCONDUCTOR

STATEMENT REGARDING FEDERALLY SPONSORED RESEARCH & DEVELOPMENT

This invention was made with Government support under contract number DE-FC36-02GO11100 awarded by U.S. Dept. of Energy. The Government has certain rights in the invention.

BACKGROUND

The present invention relates generally to a superconductor, and in particular to a system and method for quench protection of a superconductor.

A superconductor is an element, inter-metallic alloy, or compound that will conduct electricity without resistance when cooled below a critical temperature. Superconductivity occurs in a wide variety of materials, including elements such as tin and aluminum, various metallic alloys, some heavily doped semiconductors, and certain ceramic compounds. In conventional superconductors, superconductivity is caused by a force of attraction between certain conduction electrons arising from the exchange of phonons, which causes the fluid of conduction electrons to exhibit a super fluid phase composed of correlated pairs of electrons.

Superconductors are useful in a variety of applications including magnetic resonance imaging systems and power generation systems, such as motors and generators. The loss of electrical resistance in the superconductor enables these devices to be operated with a much greater efficiency. However, a portion of the superconductor undergoes a transition from the superconducting state to a normal resistive state when the current in the superconductor is driven beyond a critical current limit. This causes the temperature of the superconductor to rise due to heat produced by the resistive heating occurring in the superconductor. If this resistive heating loss continues, the superconductor may enter a state of irreversible thermal runaway, known as a quench. Damage may be caused to the superconductor due to the thermal runaway. For example, in a superconductive rotor coil, an excessive temperature gradient may be generated as a result of resistive heating. The temperature gradient may cause differential thermal expansion across the superconductive coil that damages the superconductive coil. The superconductor and/or insulation may also be damaged by excessive temperature reached during a quench.

Accordingly, a technique that enables a quench condition of the superconductor to be detected is desirable. In addition, a technique that enables the superconductor to be protected from damage that may be caused by quenching is also desirable.

BRIEF DESCRIPTION

In accordance with one aspect of the present technique, a rotating electric machine having a superconductive rotor coil is provided. The rotating electrical machine also comprises a quench protection system. The quench protection system is operable to protect the superconductive rotor coil from damage due a quench condition. The quench protection system may comprise a voltage detector that is operable to produce a signal representative of superconductive rotor coil voltage. The voltage detector is communicatively coupled to a circuit that is operable to cancel electrical noise from the signal representative of superconductive rotor coil voltage. The resulting signal is representative of a rise in superconductor rotor voltage over time. The system may comprise a control circuit that is also communicatively coupled to the circuit. The control circuit is configured to receive the signal representative of a rise in superconductor rotor voltage over time. The control circuit also is operable to initiate a corrective action to protect the superconductive rotor coil from the quench condition when the signal representative of a rise in superconductor rotor voltage over time rises to a defined voltage.

In accordance with another aspect of the present technique, a method of detecting a quench condition in a superconductor is provided. The method may comprise detecting voltage across the superconductor and removing electrical noise from a signal representative of voltage across the superconductor due to electrical resistance in the superconductor. The method may also comprise comparing the signal representative of voltage across the superconductor due to electrical resistance in the superconductor to a reference voltage representative of voltage across the superconductor due to a defined electrical resistance in the superconductor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
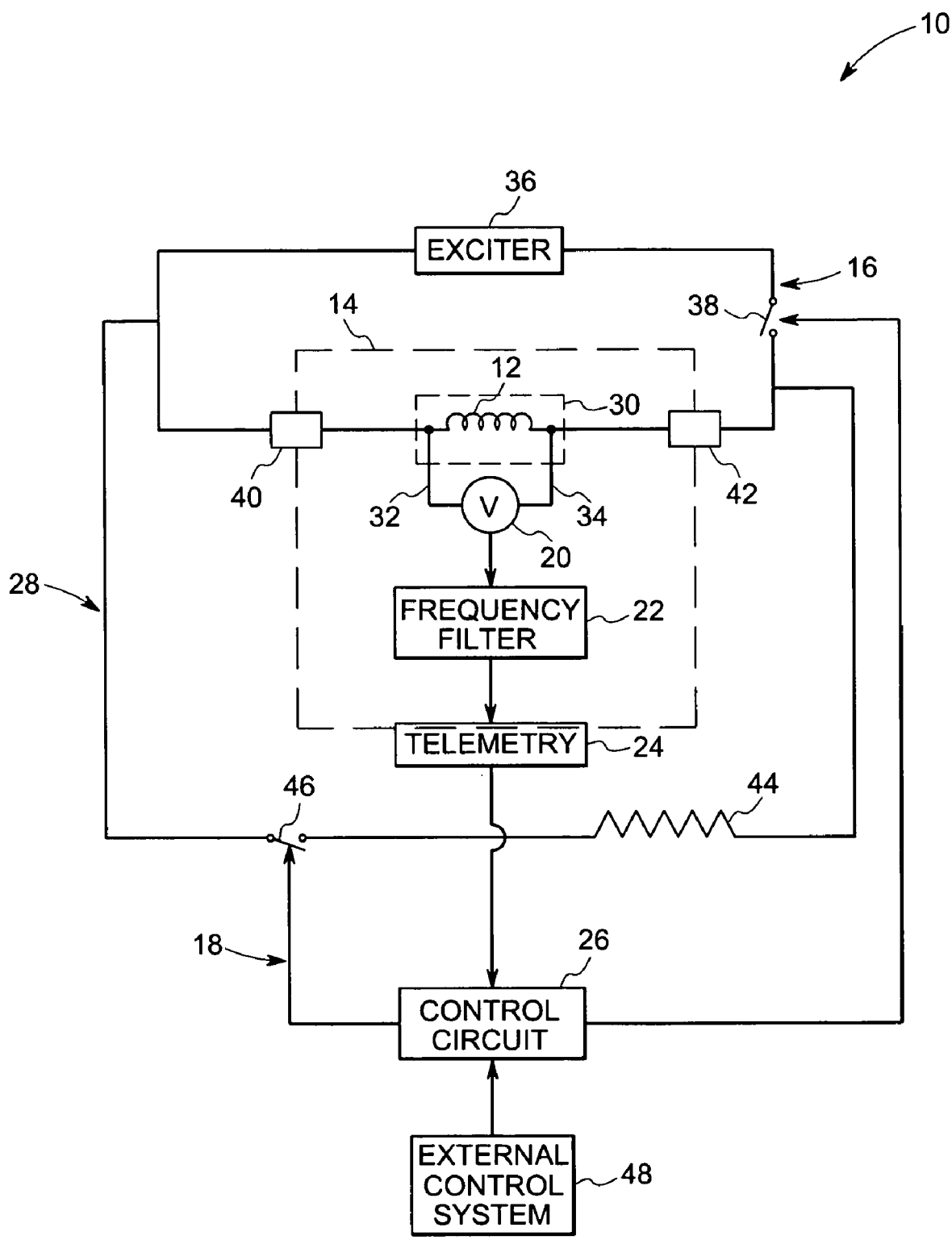
FIG. 1 is a schematic view of a generator having a superconductive rotor coil and a quench protection system for protecting the superconductive rotor coil from damage due to quenching in the superconductive rotor coil, in accordance with an exemplary embodiment of the present technique.

Referring now to FIG. 1, a rotating electrical machine is illustrated, and represented generally by reference numeral 10. In this embodiment, the rotating electrical machine 10 is a generator. However, the techniques described below are applicable to motors, as well as generators. In addition, the techniques may be used in other systems that utilize superconductors, such as medical imaging systems. In this embodiment, the generator 10 has a high temperature superconductive rotor coil 12 that is disposed on a rotor 14. The superconductive rotor coil 12 produces a magnetic field from electricity that it receives from an exciter circuit 16. Examples of exciter circuits may include DC exciter circuit, AC exciter circuit, static exciter circuit or the like. The exciter circuit 16 is explained in more detail below. When the electrical current flowing through the superconductive rotor coil 12 exceeds the critical current, a portion of the superconductive rotor coil 12 loses its superconductivity and a quench condition in the superconductive rotor coil 12 may result.

A quench protection system 18 is provided to protect the superconductive rotor coil 12 from damage due to a quench condition. The quench protection system 18 is operable to detect an increase in the resistance of the superconductive rotor coil 12 as a result of resistive heating before a quench condition exists in the rotor coil 12. This enables the system 18 to act to prevent damage to the rotor coil 12 before the quench condition exists. The quench condition may be detected based on an increase in voltage across the coil 12 caused by the increase in electrical resistance of the portions of the coil 12 experiencing resistive heating. As the resistive heating propagates through the superconductive rotor coil 12, the volume of the coil 12 contributing to the increase in resistance of the coil 12 increases, increasing the voltage across the coil 12. However, voltages also are induced in the superconductive rotor coil 12 during normal operation. For example, voltage changes may be induced in the rotor coil 12 by external magnetic fields and by changes in the load on the generator. It is therefore difficult to distinguish voltage increase due to resistive heating or a quench from the relatively large voltages induced in the coil 12. However, the present system is operable to determine whether the increase in voltage across the rotor coil is due to normal operation or a quench condition.

In the illustrated embodiment, the quench protection system 18 comprises a voltage detector 20, a frequency filter 22, a telemetry system 24, a control circuit 26, and a dump circuit 28. A disadvantage of prior techniques is that it was difficult to detect the superconductive rotor coil voltage accurately across the rotating superconducting coil because the quench detection circuit was typically located on a stationary portion of the generator away from the rotor. However, in this embodiment, the voltage detector 20 is disposed on the rotor 14 and is coupled directly across the coil 12.

The voltage detector 20 is operable to transmit a signal representative of the voltage across the rotor coil 12 to the control circuit 26 via the frequency filter 22. In this embodiment, the frequency filter 22 is a low pass filter. The low pass filter is selected to block voltage signals that are not representative of an increase in voltage across the rotor coil 12 caused by a quench condition. Upon receipt of the signal from the frequency filter 22, the control circuit 26 determines if a quench condition exists in the rotor coil 12. If a quench condition exists, the control circuit may remove or reduce power to the rotor coil 12, or direct the quench protection system 18 to take other actions to protect the superconductive rotor coil 12 from any damage that may be caused by the quench condition. In addition, the control circuit 26 is operable to direct the dump circuit 28 to discharge the magnetic energy stored in the coil 12 when a quench condition is detected.

In this embodiment, the voltage detector 20 is disposed on the rotor 14. Furthermore, in accordance with the embodiment illustrated in FIG. 1, the frequency filter 22, the control circuit 26, and the dump circuit 28 are displaced away from the rotor 14. However, one or more of these devices may be disposed on the rotor 14. An electromagnetic induction shield 30 is disposed around the superconductive rotor coil 12. The voltage detector 20 has conductive leads 32 and 34 that are routed through the electromagnetic induction shield 30 to the superconductive rotor coil 12.

The illustrated embodiment utilizes the telemetry system 24 to transmit the signal representative of superconductive rotor coil voltage from the voltage detector 20 to the portions of the quench protection system 18 located externally of the rotor 14, such as the control circuit 26. The frequency filter 22 receives the signal representative of voltage across the superconductive rotor coil 12 from the voltage detector 20 and blocks signals that are not related to the detection of a quench condition in the superconductive rotor coil 12, such as electrical noise and voltages induced in the rotor coil 12 by external magnetic fields. For example, the frequency filter 22 may block signals having a frequency outside an expected frequency range for signals representative of an increase in voltage due to an increase in resistive heating in the coil 12. Conversely, the filter 22 enables signals having a frequency within the expected frequency range to pass to the control circuit 26. The control circuit 26 receives the output of the frequency filter 22 and uses the output to establishes whether or not resistive heating or a quench condition is occurring in the superconductive rotor coil 12.

As noted above, the superconductive rotor coil 12 receives electricity from the exciter circuit 16. The exciter circuit 16 comprises an exciter 36, a switch 38, and slip rings 40 and 42. The exciter 36 produces an electric current. The slip rings 40 and 42 couple the electrical current from the exciter 36, which is stationary, to the rotor 14, which is rotating. The switch 38 is controlled by the control circuit 26. The switch 38 may be opened by the control circuit 26 to prevent current from flowing from the exciter to the superconductive rotor coil 12. The exciter 36 may also be used to provide power to the voltage detector 20, the frequency filter 22, the control circuit 26, and the dump circuit 28.

The dump circuit 28 comprises a dump resistor 44 and a switch 46. The switch 46 is controlled by the control circuit 26. As discussed above, the control circuit 26 opens the exciter circuit switch 38 when a rise in voltage due to a quench condition is detected across the rotor coil 12. In addition, the control circuit 26 closes the dump circuit switch 46. When the dump circuit switch 46 is closed, a circuit is completed between the superconductive rotor coil 12 and the dump resistor 44. This provides a path for the superconductive rotor coil 12 to discharge the magnetic energy stored in the coil 12 through the dump resistor 44. The magnetic energy stored in the coil 12 is converted into electricity and discharged through the dump resistor 44. Thus, in this embodiment, the quench protection system 18 is operable to remove the supply of current to the coil 12 from the exciter 36 and to enable the energy stored in the coil 12 to be discharged. This prevents further resistive heating of the superconductive rotor coil 12.

The voltage across the superconductive rotor coil 12 may be influenced by external transient faults such as a grid transmission breaker trip or a lightning strike. This may lead the quench protection system 18 to believe that a quench condition exists, when in actuality it does not. In the illustrated embodiment, an external control system 48 is provided to detect external transient faults. When an external transient fault is detected, the external control system 48 may transmit a signal to the control circuit 26 to inform the control circuit 26 of the transient fault. The control circuit 26 may then disregard, or compensate for, the signal from the voltage detector 20 until the transient fault has passed to prevent an inadvertent loss of operation.

Figure 2:
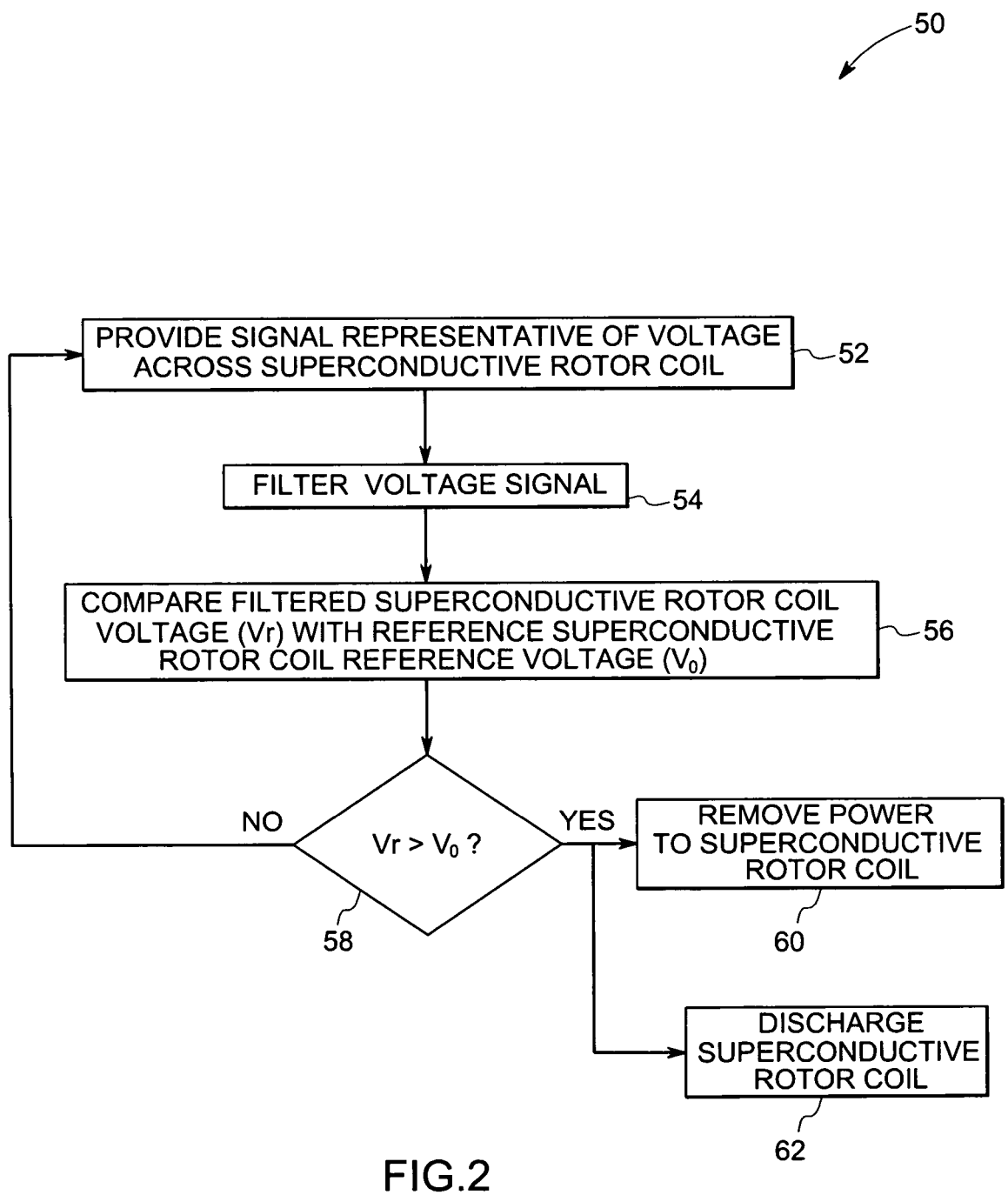
FIG. 2 is a flow chart illustrating a method of quench protection for the superconductive rotor coil of FIG. 1.

Referring generally to FIG. 2, a method of utilizing the quench protection system 18 to protect the superconductive rotor coil 12 from a quench condition is illustrated, and represented generally by reference numeral 50. The method 50 comprises providing a signal representative of voltage across the superconductive rotor coil 12, as represented by block 52. The method also comprises utilizing the frequency filter 22 to filter the signal to remove voltage signals that are not related to establishing whether a quench condition exists in the superconductive rotor coil 12, as represented by block 54. For example, the frequency filter 22 may be used to block higher frequencies representative of electrical noise from passing through the filter 22, while enabling signals having lower frequencies that are representative of an increase in voltage across the coil 12 due to resistive heating to pass.

The method also comprises providing a reference voltage (Vo) and comparing the filtered superconductive rotor coil voltage signal (Vr) to the reference voltage (Vo), as represented by block 56. The reference voltage (Vo) is a threshold voltage that represents a voltage increase across the superconductive rotor coil 12 due to a defined amount of resistive heating in the coil 12. The reference voltage (Vo) is utilized to prompt action by the control circuit 26 of quench protection system 18. The control circuit 26 may be used to provide the reference voltage (Vo) and to compare the filtered superconductive rotor coil voltage signal (Vr) to the reference voltage (Vo). The value of the reference voltage (Vo) may be adjusted to produce the desired response. Several factors may be considered in establishing the value of the reference voltage. For example, a low reference voltage may result in spurious indications of a quench condition, causing the quench protection system to operate inadvertently. Conversely, a high reference voltage may result in damage to the coil 12 from resistive heating before the quench protection system 18 can act to protect the coil 12.

The method also comprises determining whether the filtered superconductive rotor coil voltage signal (Vr) is greater than the reference voltage (Vo) or not, as represented by block 58. If the filtered superconductive rotor coil voltage (Vr) does not exceed the reference voltage (Vo), the operation of the system continues as normal. However, if the filtered superconductive rotor coil voltage (Vr) exceeds the reference voltage (Vo), the control circuit 26 directs the exciter circuit 16 to remove power to the superconductive rotor coil 12, as represented by block 60. In addition, once the exciter circuit 16 is open, the control circuit 26 activates the dump circuit 28 to discharge the magnetic field in the superconductive rotor coil 12, as represented by block 62. With no current flowing through the coil 12, no resistive heating can occur in the coil 12. Thus, the superconductive coil 12 is protected from the harmful effects of quenching.

Figure 3:
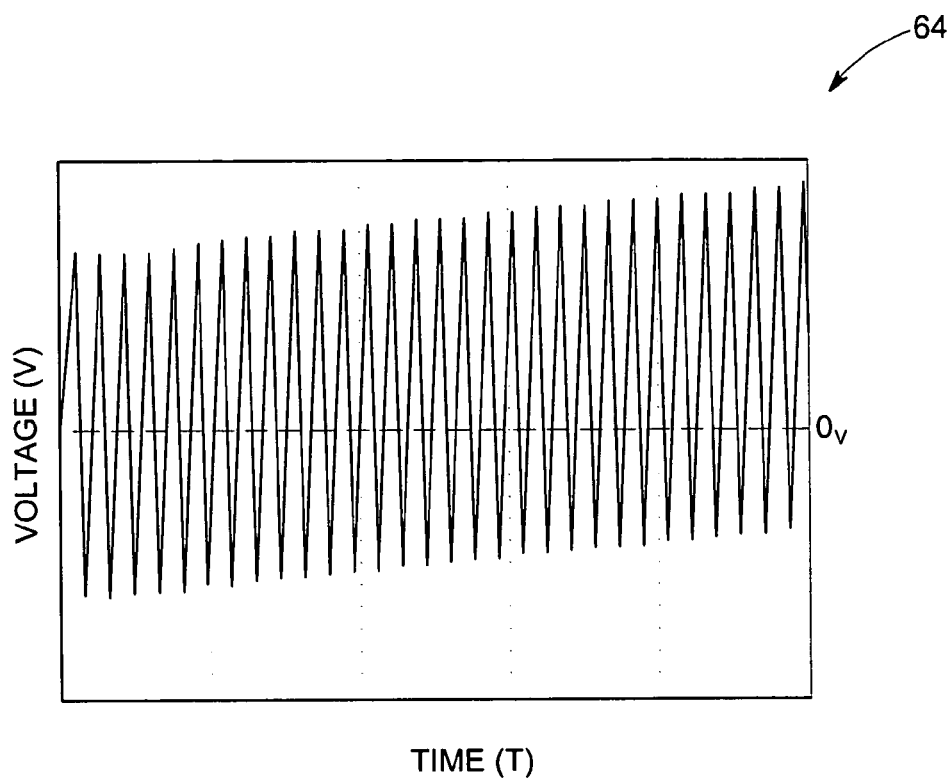
FIG. 3 is a graph of superconductive rotor coil voltage versus time, in accordance with an exemplary embodiment of the present technique.
Figure 4:
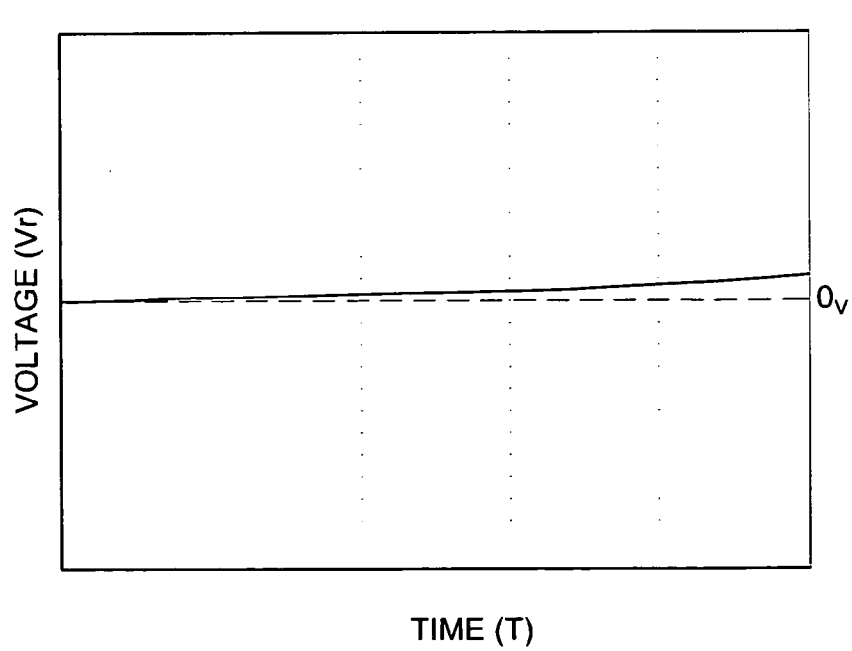
FIG. 4 is a graph of superconductive rotor coil voltage filtered to block superconductive rotor coil voltage signals that are not representative of a change in coil voltage caused by quenching.

Referring generally to FIGS. 3 and 4, an example of the operation of the frequency filter in filtering the signal representative of the superconductive rotor coil voltage is illustrated. FIG. 3 illustrates a graph of the superconductive rotor coil voltage (V) over time (T) prior to filtering, represented generally by reference numeral 64. The illustrated example of unfiltered superconductive rotor coil voltage (V) includes an electrical noise component, giving the voltage (V) a generally sinusoidal shape. However, the superconductive rotor coil 12 is experiencing resistive heating in this example. As a result, the voltage (V) is gradually increasing. FIG. 4 is a graph of the superconductive rotor coil voltage (Vr) filtered by the frequency filter 22. The filtered superconductive rotor coil voltage (Vr), represented generally by reference numeral 66, reflects the gradual increase in superconductive rotor coil voltage caused by the resistive heating in the superconductive rotor coil 12, and not electrical noise.

Figure 5:
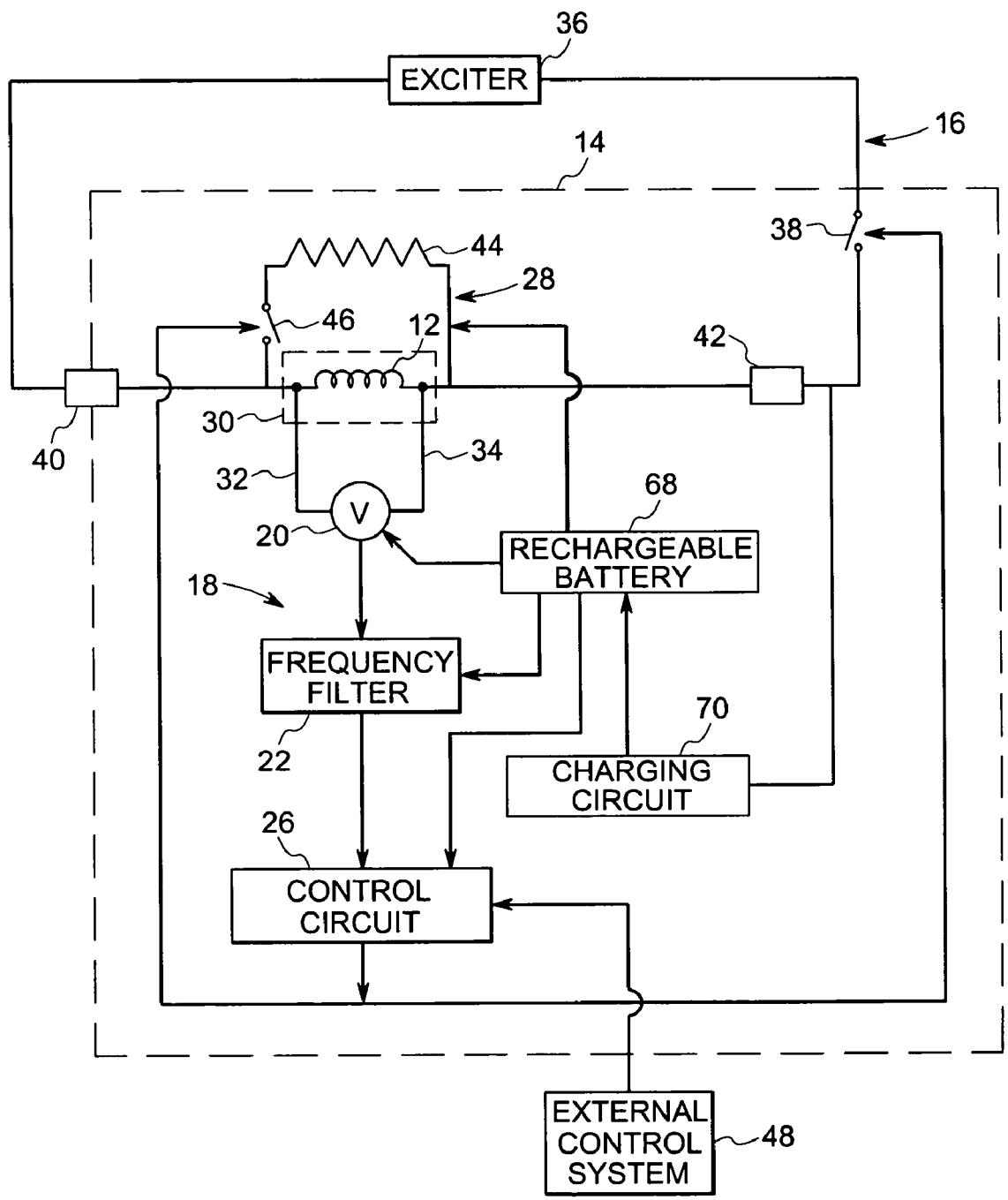
FIG. 5 is a detailed view of a quench protection system for the superconductive rotor coil in accordance with another aspect of the present technique.

Referring generally to FIG. 5, an alternative embodiment of a generator having a superconductive rotor coil 12 is illustrated. In this alternative embodiment, the quench protection system 18 functions in a similar manner to the previous embodiment. However, the frequency filter 22, the control circuit 26, and the dump circuit 28, are disposed on or within the rotor 14, rather than a stationary portion of the generator. Thus, no telemetry circuit is provided in this embodiment. A rechargeable battery 68 is provided inside the rotor 14. The rechargeable battery 68 is operable to power the voltage detector 20, the frequency filter 22, the control circuit 26, and the dump circuit 28. The battery 68 is charged by a charging circuit 70 operable to remove a predetermined amount of current fed to the rotor coil 12 via the exciter circuit 16. Charging of the battery may occur during periods when substantially sufficient voltage is generated across the coil 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotating electric machine, comprising:
    a rotor, comprising:
    a superconductive rotor coil; and
    a quench protection system operable to protect the superconductive rotor coil from a quench condition, comprising:
    a voltage detector secured to the rotor and electrically coupled across the superconductive rotor coil and operable to produce a signal representative of superconductive rotor coil voltage;
    a circuit coupled to the voltage detector to receive the signal representative of superconductive rotor coil voltage, wherein the circuit is operable to cancel electrical noise from the signal representative of superconductive rotor coil voltage to produce a signal representative of a rise in superconductor rotor voltage over time; and
    a control circuit communicatively coupled to the circuit, wherein the control circuit is configured to receive the signal representative of a rise in superconductor rotor voltage over time and to initiate a corrective action to protect the superconductive rotor coil from the quench condition when the signal representative of a rise in superconductor rotor voltage over time exceeds a predefined voltage.

2. The machine of claim 1, wherein the circuit comprises a frequency filter communicatively coupled to the voltage detector to receive the signal representative of superconductive rotor coil voltage, wherein the frequency filter is selected to block noise signals and to enable the signal representative of a rise in superconductor rotor voltage over time to pass through the filter.

3. The machine of claim 2, further comprising an exciter operable to supply current to the superconductive rotor coil and a first switch operable to selectively couple the exciter to the superconductive rotor coil, wherein the first switch is controlled by the control circuit and the corrective action comprises opening the first switch.

4. The machine of claim 3, further comprising a dump resistor and a second switch operable to selectively couple the superconductive rotor coil to the dump resistor, wherein the second switch is controlled by the control circuit and the corrective action comprises closing the second switch to enable the superconductive rotor coil to discharge stored magnetic energy through the dump resistor.

5. The machine of claim 1, wherein the rotor comprises an electromagnetic shield disposed over the superconductive rotor coil and the voltage detector comprises leads extending through the electromagnetic shield to the superconductive rotor coil.

6. A rotating electric machine comprising:
an exciter;
a rotor, comprising:
a superconductive rotor coil electrically coupled to the exciter by a switch; and
a quench protection system, comprising:
a voltage detector secured to the rotor and electrically coupled across the superconductive rotor coil, wherein the voltage detector is operable to produce a signal representative of superconductive rotor coil voltage; and
a control circuit communicatively coupled to the voltage detector, wherein the control circuit is operable to open the switch to remove power to the superconductive rotor coil when the signal representative of superconductive rotor coil voltage received by the control circuit exceeds a predefined voltage.

7. The machine of claim 6, wherein the quench protection system further comprises a frequency filter, wherein the control circuit is communicatively coupled to the voltage detector via the frequency filter, wherein the frequency filter is configured to enable signals representative of superconductive rotor coil voltage within a desired frequency band to pass through the filter to the control circuit and to block signals having a frequency outside the desired frequency band from reaching the control circuit.

8. The machine of claim 6, wherein the desired frequency band corresponds to an expected change in voltage across the superconductive rotor coil due to resistive heating of the superconductive rotor coil caused by a quench condition in the superconductive rotor coil.

9. The machine as recited in claim 7, wherein the frequency filter is disposed on the rotor.

10. The machine as recited in claim 9, wherein the control circuit is disposed on the rotor.

11. The machine of claim 6, wherein the predefined voltage is representative of a rise in superconductive rotor coil voltage due to a rise in resistance of the superconductive rotor coil caused by resistive heating.

12. The machine of claim 11, wherein the quench protection system further comprises a resistor and a second switch coupled to the control circuit, wherein the control circuit closes the second switch to couple the resistor to the superconductive rotor coil when the signal representative of superconductive rotor coil voltage exceeds a predefined voltage.

13. The machine of claim 12, wherein the resistor is disposed on the rotor.

14. The machine of claim 6, wherein the quench protection system further comprises a rechargeable battery secured to the rotor and operable to provide power to the voltage detector.

15. The machine of claim 6, wherein the rotating electrical machine is electrically coupled to an external electrical circuit, the quench protection system further comprising an external control system operable to detect an external transient fault on the external electrical circuit and to provide a signal to the control circuit to indicate the external transient fault.

16. A quench protection system, comprising:
a voltage detector electrically coupled to a superconductor, wherein the voltage detector is operable to produce a signal representative of superconductor rotor coil voltage;
a control circuit operable to control power to the superconductor rotor coil; and
a filter coupled to the voltage detector and the control circuit, wherein the filter enables signals within a desired frequency band to pass through the filter to the control circuit and blocks signals having a frequency outside the desired frequency band from passing through the filter to the control circuit,
wherein the control circuit decouples the superconductor coil from power when the signals within a desired frequency band exceed a defined voltage.

17. The system of claim 16, further comprising a first switch disposed between the superconductor rotor coil and a source of power, wherein the control circuit is operable to open the first switch when the signals within a desired frequency band exceeds the defined voltage.

18. The system of claim 16, further comprising a second switch disposed between the superconductive rotor coil and a resistor, wherein the control circuit is operable to close the second switch to discharge the magnetic energy stored in the superconductor rotor coil through the resistor when the signals within a desired frequency band exceed the defined voltage.

19. The system of claim 18, wherein the filter is a low-pass filter.

20. A method of detecting a quench condition in superconductor rotor coil, comprising:
detecting voltage across the superconductive rotor coil;
wherein detecting voltage across the superconductive rotor coil comprises disposing a voltage detector on a rotor to detect voltage across the superconductive rotor coil;
producing a signal representative of voltage across the superconductive rotor coil;
removing electrical noise from the signal representative of voltage across the superconductive rotor coil to produce a signal representative of a voltage across the superconductive rotor coil due to electrical resistance in the superconductive rotor coil; and
comparing the signal representative of voltage across the superconductive rotor coil due to electrical resistance in the superconductive rotor coil to a reference voltage representative of voltage across the superconductive rotor coil due to a defined electrical resistance in the superconductive rotor coil.

21. The method of claim 20, wherein comparing comprises coupling the signal representative of voltage across the superconductive rotor coil due to electrical resistance in the superconductive rotor coil to a control circuit operable to produce a signal when the signal representative of voltage across the superconductive rotor coil due to electrical resistance in the superconductive rotor coil rises to the reference voltage representative of voltage across the superconductive rotor coil due to a defined electrical resistance in the superconductive rotor coil.

22. The method of claim 20, wherein the defined electrical resistance in the superconductive rotor coil is representative of a quench condition.

23. The method of claim 20, wherein removing electrical noise from the signal representative of superconductive rotor coil voltage comprises coupling the signal representative of voltage across the superconductive rotor coil through a filter operable to block electrical noise from passing through the filter.

24. The method of claim 20, further comprising detecting transient conditions on an external circuit coupled to the superconductive rotor coil and providing a signal representative of the transient condition to the control circuit to direct the control circuit to stand-by until the transient condition passes.

25. The method of claim 20, wherein the superconductive is disposed on a rotor of a rotating electrical machine.

26. A method of protecting a superconductive rotor coil from a quench condition, comprising:
coupling current to a superconductive via a switch;
producing a signal representative of the voltage across the superconductive rotor coil; wherein producing a signal representative of the voltage across the superconductive rotor coil comprises disposing a voltage detector on a rotor detect the voltage across the superconductive rotor coil;
removing signals within a defined frequency band from the signal representative of the voltage across the superconductive rotor coil to provide a filtered signal representative of superconductive rotor coil voltage; and
opening the switch to prevent current from flowing to the superconductive rotor coil when the filtered signal representative of superconductive rotor coil voltage exceeds the defined voltage.

27. The method of claim 26, wherein the superconductive rotor coil disposed on a rotor of a rotating electrical machine.

28. The method of claim 27, wherein the rotor comprises an exciter, and wherein coupling current to a superconductive rotor coil via a switch comprises coupling the exciter to the superconductive rotor coil via the switch.

29. The method of claim 28, wherein removing signals within a defined frequency band from the signal representative of the voltage across the superconductive rotor coil comprises coupling the signal representative of the voltage across the superconductive rotor coil through a filter selected to block electrical noise from passing through the filter.

30. The method of claim 29, comprising closing a second switch to discharge the superconductive rotor coil through a dump resistor when the filtered signal representative of superconductive rotor coil voltage exceeds the defined voltage.

* * * * *